United States Patent [19]

Weber

[11] Patent Number: 4,520,492
[45] Date of Patent: May 28, 1985

[54] METHOD FOR DETERMINING THE OPTIMUM SAMPLING TIMES FOR A QPSK OR QAM RECEIVED SIGNAL

[75] Inventor: Herbert Weber, Backnang, Fed. Rep. of Germany

[73] Assignee: Licentia Patent-Verwaltungs-GmbH, Frankfurt am Main, Fed. Rep. of Germany

[21] Appl. No.: 426,163

[22] Filed: Sep. 28, 1982

[30] Foreign Application Priority Data

Nov. 21, 1981 [DE] Fed. Rep. of Germany ....... 3146281

[51] Int. Cl.³ ............................................. H04B 15/02
[52] U.S. Cl. .......................................... 375/86; 375/99
[58] Field of Search ...................... 375/75, 86, 94, 95, 375/100, 102, 39, 14, 99, 101; 364/486; 328/151; 329/124

[56] References Cited

U.S. PATENT DOCUMENTS

| | | | |
|---|---|---|---|
| 3,617,900 | 11/1971 | Fink | 375/120 |
| 3,646,446 | 2/1972 | Rittenbach | 375/79 |
| 3,733,550 | 5/1973 | Tazaki et al. | 375/20 |
| 3,761,818 | 9/1973 | Tazaki et al. | 375/95 |
| 3,925,732 | 12/1975 | Tanaka et al. | 375/99 |
| 3,962,637 | 6/1976 | Motley et al. | 375/14 |
| 4,143,322 | 3/1979 | Shimamura | 375/81 |
| 4,352,194 | 9/1982 | Caracappa | 375/80 |
| 4,355,284 | 10/1982 | Acker | 375/95 |
| 4,370,748 | 1/1983 | Janc et al. | 375/95 |

FOREIGN PATENT DOCUMENTS 1512561 5/1975 Fed. Rep. of Germany .
2544124 4/1976 Fed. Rep. of Germany .

*Primary Examiner*—Robert L. Griffin
*Assistant Examiner*—Stephen Chin
*Attorney, Agent, or Firm*—Spencer & Frank

[57] ABSTRACT

A method for determining the optimum sampling times in a quadrature phase shift keyed (QPSK) or quadrature amplitude modulated (QAM) received signal influenced by interference in the radio link between a transmitter and a receiver. The amplitudes of the two quadrature components of the received signal are compared in the receiver and the points in time at which the two amplitudes have the same magnitude are utilized as the sampling times.

2 Claims, 5 Drawing Figures

4,520,492

METHOD FOR DETERMINING THE OPTIMUM SAMPLING TIMES FOR A QPSK OR QAM RECEIVED SIGNAL

BACKGROUND OF THE INVENTION

The present invention relates to a method for determining the optimum sampling times for a quarature phase shift keyed (QPSK) or quadrature amplitude modulated (QAM) received signal that has been influenced by radio link interferences.

In the transmission of such a phase or amplitude and phase modulated signal over a directional radio path, multipath propagation frequently produces strong interference which make faultfree demodulation more difficult. Due to the multipath propagation, the two quadrature components of the modulation signal experience amplitude as well as phase travel time distortions. There now exists the problem of determining, for the distorted quadrature components of the received signals, sampling times in the demodulator which assure the best possible error free recovery of the original information from the interfered with signal. German Pat. No. 1,512,561 discloses a method according to which sampling occurs always at that time at which one of the quadrature components reaches its maximum. However, due to the amplitude and phase travel time distortions, there are circumstances when this maximum may lie very far away from the sampling value representing the correct information.

SUMMARY OF THE INVENTION

It is therefore the object of the present invention to provide a method for determining the optimum sampling times for a quadrature phase shift keyed (QPSK) or quadrature amplitude modulated (QAM) received signal influenced by interference in the radio link between a transmitter and a receiver so that the received signal at these sampling times yields the correct original information in spite of the interference.

The above object is achieved according to the present invention by comparing the amplitudes of the two quadrature components of the received signal in the receiver, and setting the times at which the amplitudes of the two quadrature components are identical in magnitude as the sampling times.

This method according to the invention has the advantage that amplitude and phase travel time distortions in the modulation signal produced by lowpass and bandpass filters in the transmitter and receiver likewise do not interfere with the detection of the correct, original information.

DETAILED DESCRIPTION OF THE PREFERRED EMBODIMENT

Figure 1:
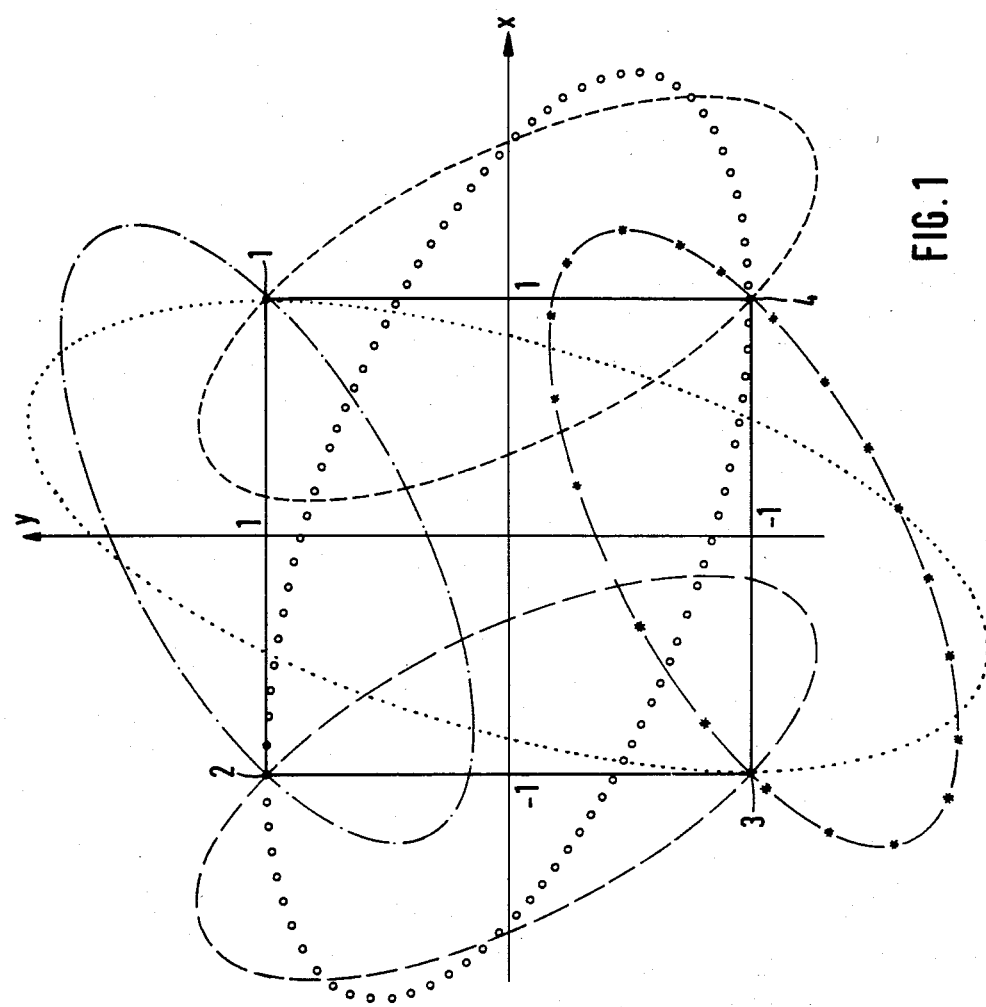
FIG. 1 shows the modulation signal, represented in the phase plane of a QPSK signal.

Referring now to FIG. 1, there is shown the phase plane of a QPSK signal which has four different signal states 1, 2, 3 and 4 which are associated with different fixed bit pairs. These four different signal states 1, 2, 3 and 4 result from the combination of the two quadrature components x and y, that can take on amplitude values $(+1, -1)$ shifted by 180° with respect to one another.

If the modulation signal is not interfered with during transmission, the transitions between the individual signal states 1, 2, 3 and 4 take place on a direct path, for example, as shown by the solid lines. In this case, interrogating one of the quadrature components x or y for its maximum will always produce the optimum sampling times at which signal states exist which represent the precise original information.

In the case of interference, i.e. when there are amplitude and phase travel time distortions in the modulation signal due to multipath propagation on the radio link, the transitions from one signal state to the next no longer take place on a straight path but on an elliptical path. The various elliptical transitions between signal states 1, 2, 3 and 4 are shown in FIG. 1. The oblique position of the various ellipses depends on the magnitude of the phase travel time distortion and the width of the various ellipses depends on the magnitude of the amplitude distortion.

Independently of the distortions, the various ellipses always go through those points 1, 2, 3 and 4 which correspond to the unfalsified signal states containing the original information. These points are distinquished by the fact that they result from the combination of the two quadrature components having the same magnitude of amplitude. Consequently, if one is in the vicinity of the signal states 1, 2, 3 or 4, the demodulator compares the amplitudes of the two quadrature components x and y and fixes as sampling times those points in time at which the amplitudes have the same magnitude.

Figure 2:
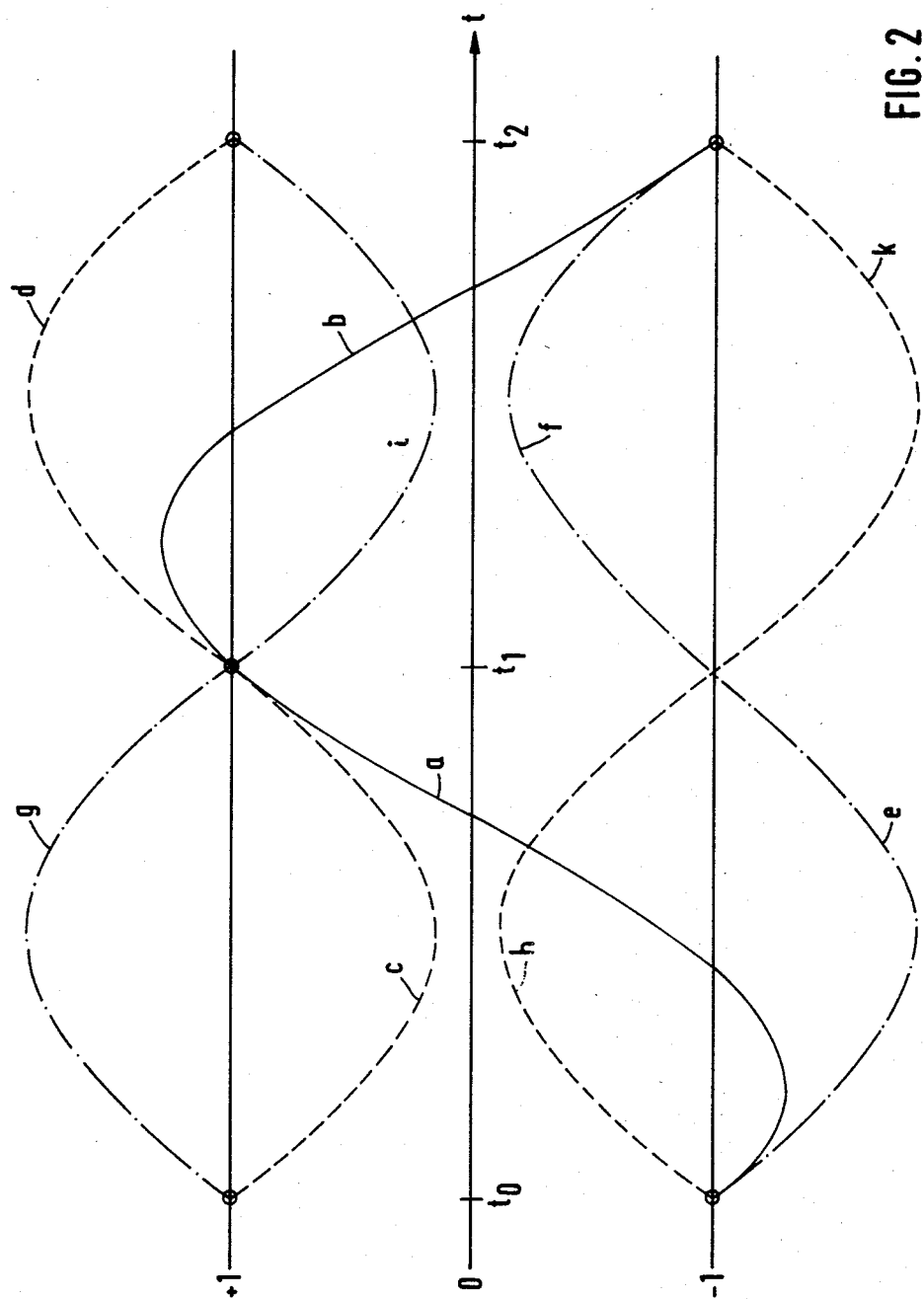
FIG. 2 shows the time sequence of the QPSK modulation signal when it changes from one signal state to the other.

The transistions from one signal state to the next are illustrated by the time plane shown in FIG. 2. The individual curve sections a through k represent the following signal state transitions of the quadrature components x and y which are influenced by interference in the radio link.

| | |
|---|---|
| x (1→2): b | y (1→2): d |
| x (2→1): a | y (2→1): c |
| x (2→3): k | y (2→3): b |
| x (3→2): h | y (3→2): a |
| x (3→4): a | y (3→4): e |
| x (4→3): b | y (4→3): f |
| x (4→1): g | y (4→1): a |
| x (1→4): i | y (1→4): b |

For the sake of clarity, the transitions (1→3), (3→1), (2→4) and (4→2) are not shown in FIG. 2.

The illustration of the QPSK signal in the time plane of FIG. 2 also shows that fixed points of intersection of the curves do exist and that these intersections occur at times $t_0$, $t_1$ and $t_2$, at which the magnitudes of the amplitudes of the two quadrature components x and y are the same. As mentioned above, according to the invention the sampling takes place at times $t_0$, $t_1$ and $t_2$ for the QPSK signal.

The method according to the invention for the determination of optimum sampling times has been described with the aid of QPSK modulation with only four signal states. The method can be employed just as well for QAM modulation where different signal states are produced by amplitude staggering of the quadrature components 8, 16, 32.

Figure 3:
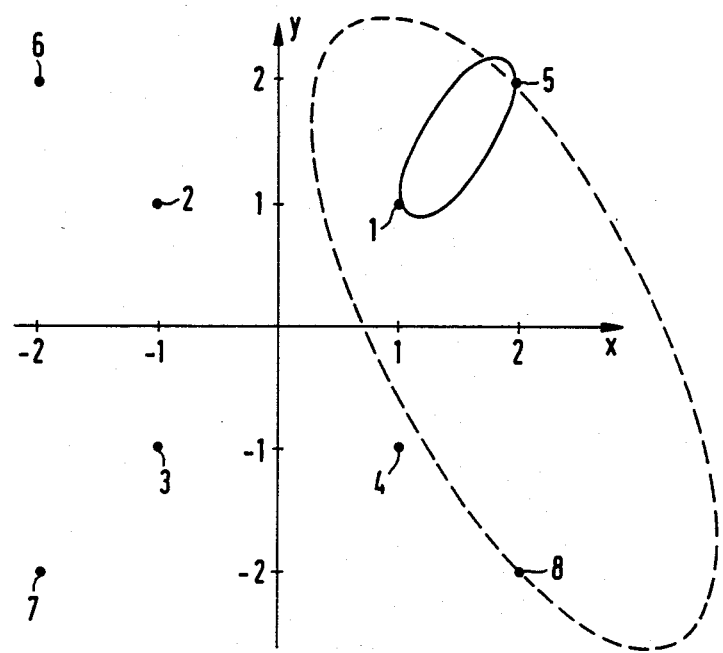
FIG. 3 shows the modulation signal, represented in the phase plane of a QAM signal.

FIG. 3 shows the phase plane of a QAM signal which has for example eight different signal states 1 . . . 8. All of these eight signals result from the combination of the two quardrature components x and y, that can take on amplitude values (+1, −1, +2, −2).

If the modulation signal is not interfered with during transmission, the transistions between the individual signal states 1 . . . 8 take place on a direct path similarly to the QPSK System shown in FIG. 1.

If there are amplitude and phase travel time distortions in the modulation signals the transitions from one signal state to the next take place on a elliptical path. For example, two such elliptical paths, which are similar to the elliptical paths of the QPSK System in FIG. 1, are drawn in the phase plane shown in FIG. 3.

As in a QPSK System, a QAM System also has points 1 . . . 8 which result from the combination of the two quadrature components x and y having the same magnitude of amplitude. The demodulator detects some or all of these points which correspond to the unfalsified signal states by comparing the amplitudes of the two quadrature components and produces pulses which synchronize the clock of the demodulator.

Figure 4:
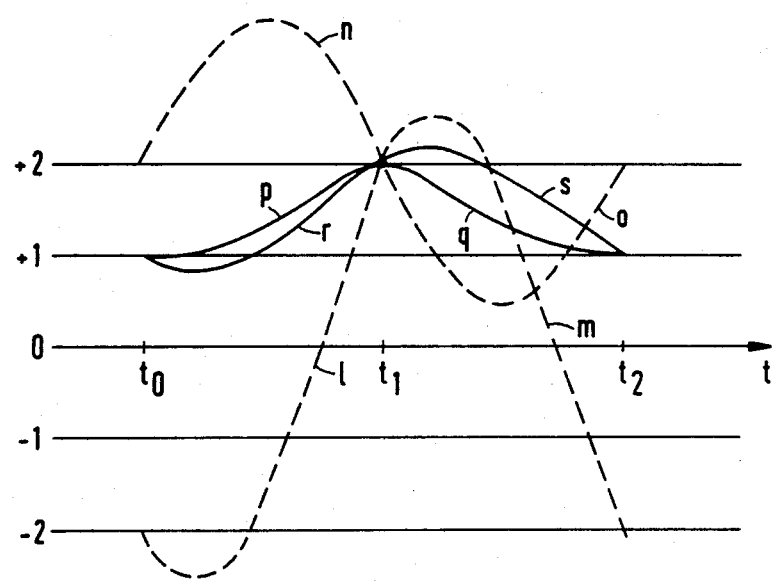
FIG. 4 shows the time sequence of the QAM modulation signal when it changes from one signal state to the other.

The transitions of the signal states 1 to 5, 5 to 1, 8 to 5 and 5 to 8 are illustrated by the time plane shown in FIG. 4. For the sake of clarity all other transitions are not shown. The individual curve sections n through s represent the following signal state transitions of the quadrature components x and y which are influenced by interference in the radio link.

| | |
|---|---|
| x (8→5): n | y (8→5): l |
| x (5→8): o | y (5→8): m |
| x (1→5): p | y (1→5): r |
| x (5→1): q | y (5→1): s |

The time plane (FIG. 4) also shows that there are fixed points of intersection of the curves at times $t_0$, $t_1$, $t_2$ at which the magnitudes of the amplitudes of the two quadrature components x and y are the same.

Figure 5:
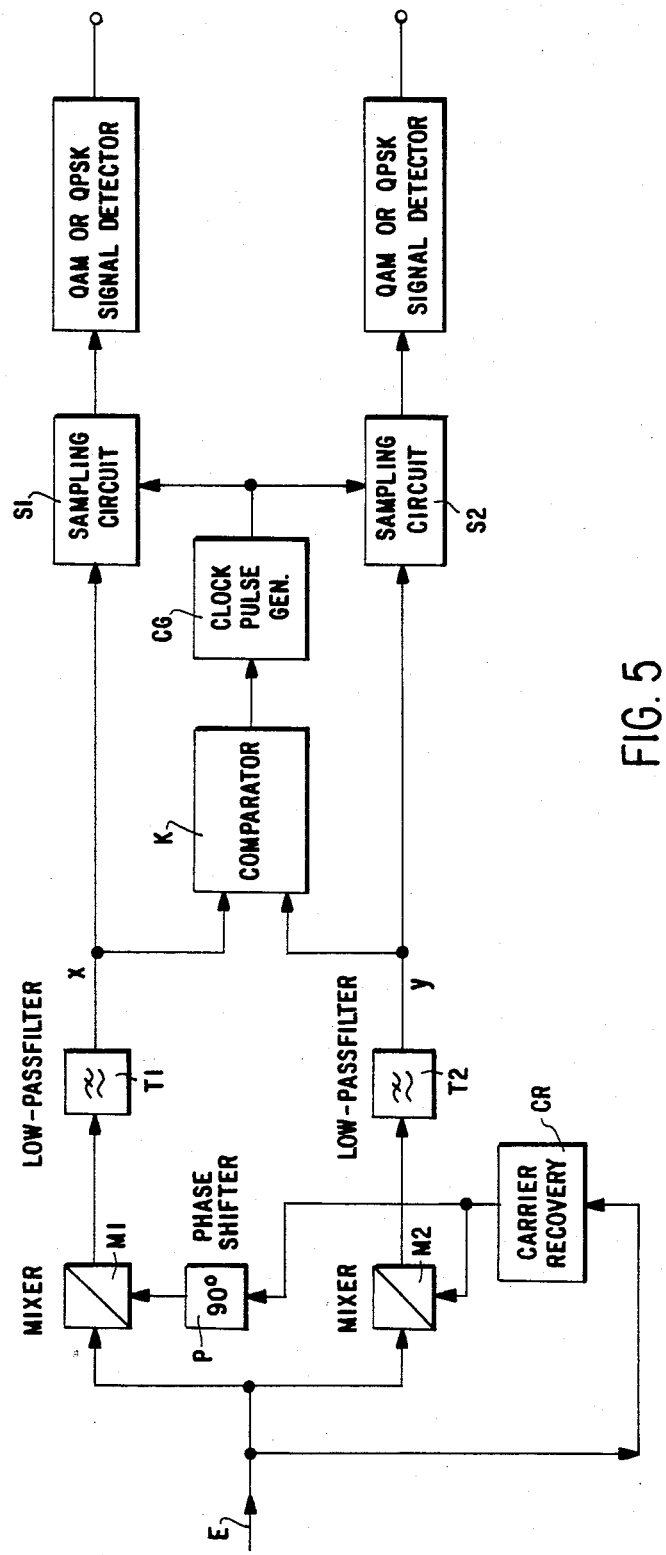
FIG. 5 shows a block diagram of a network which produces synchronisation pulses for the clock of the receiver.

FIG. 5 is a block diagram of a network which produces synchronisation pulses SP for the sampling clock of the receiver. A received QPSK or QAM signal E is fed to two mixers M1 and M2. Each mixer is controlled by the same carrier signal which is recovered from the input signal E by a carrier recovery assembly CR. However, one mixer is fed the carrier signal through a 90° phase shifter P. The outputs of the mixers M1 and M2 are connected with respective low-pass filters T1 and T2 which deliver the two quadrature signal components x and y. A comparator K produces a synchronisation pulse SP whenever the magnitudes of the amplitudes of x and y have the same values. Thus the synchronisation pulses occur at times at which the received QPSK or QAM signal has reached the points 1 . . . 4 or 5 . . . 8. The synchronisation pulses occuring from time to time serve to synchronize the clock pulse generator CG of the QPSK or QAM demodulator so that, via the sampling circuits S1 and S2, the received signal is sampled at times at which the signal represents the precise original information.

It will be understood that the above description of the present invention is susceptible to various modifications, changes and adaptions, and the same are intended to be comprehended within the meaning and range of equalivents of the appended claims.

What is claimed is:

1. A method of determining and setting the optimum sampling times for the demodulator of a receiver for a quadrature phase shift keyed (QPSK) or quadrature amplitude modulated (QAM) signal which has been influenced by interference in the radio link between a transmitter and the receiver, comprising the following steps in the receiver; separating the received signal into its two quadrature components; comparing the amplitudes of the two quadrature components; producing a synchronizing pulse whenever the amplitudes of the two quadrature components being compared have the same magnitude; and feeding said synchronizing pulses to the demodulator for the received signal to cause the demodulator to sample the received signal at points in time corresponding to said pulses.

2. A method for determining the optimum sampling times for a quadrature phase shift keyed (QPSK) or quadrature amplitude modulated (QAM) received signal influenced by interference in the radio link between a transmitter and a receiver comprising the steps of: comparing the amplitudes of the two quadrature components of the received signal in the receiver; and setting the points in time at which the amplitudes of the two quadrature components have the same magnitude as the sampling times, said step of setting including producing a synchronization pulse whenever said amplitudes of said two quadrature components have the same magnitude, and utilizing said synchronization pulse to synchronize the clock of the demodulator for the received signal in the receiver.

* * * * *